UNITED STATES PATENT OFFICE.

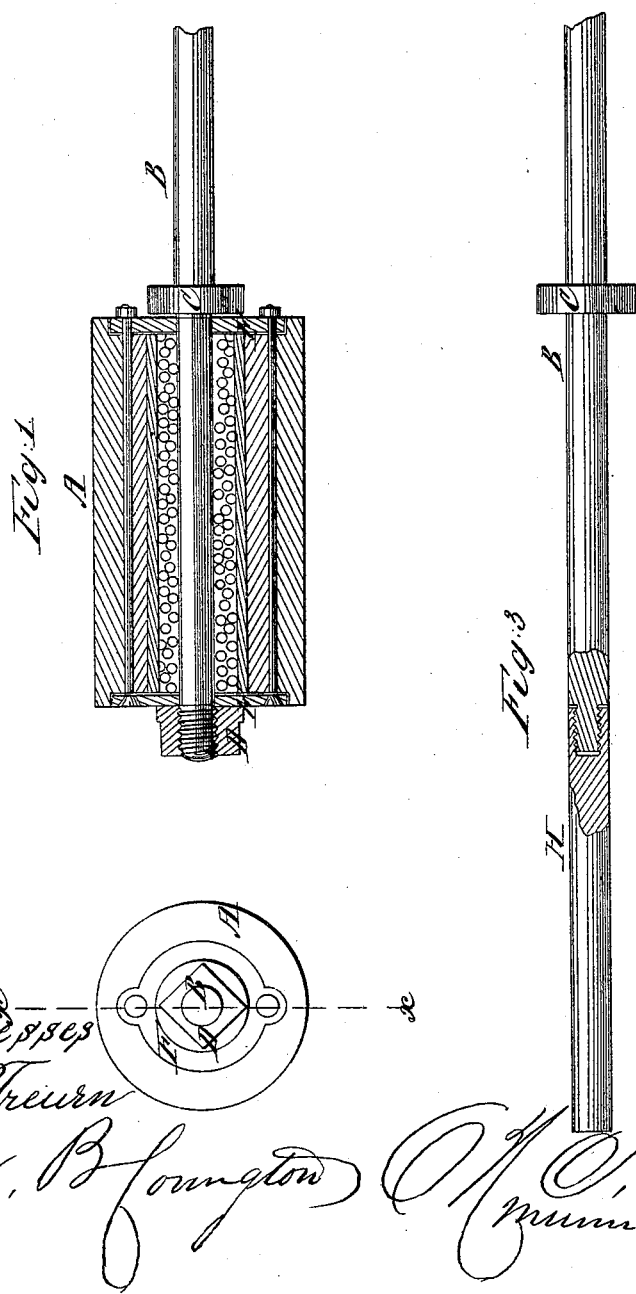

O. H. P. ROBINSON, OF BELLPORT, NEW YORK.

IMPROVEMENT IN AXLE-BOXES.

Specification forming part of Letters Patent No. 53,186, dated March 13, 1866.

*To all whom it may concern:*

Be it known that I, O. H. P. ROBINSON, of Bellport, Suffolk county, State of New York, have invented a new and useful Improvement in Boxes for Axles and Shafting; and I do hereby declare that the following is a full, clear, and exact description thereof, which will enable others skilled in the art to make and use the same, reference being had to the accompanying drawings, forming part of this specification, in which—

Figure 1 is an axial section of an axle-box made according to my invention, showing it applied to a wagon hub and axle. Fig. 2 is an end view of the hub. Fig. 3 is an axial section of a false axle or shaft, by means of which the true axle or shaft can be removed without disturbing the contents of the box.

Similar letters of reference indicate like parts.

This invention consists in a novel construction of axle-boxes and boxes for shafting, and for all bearings of journals that have rotary motion, whether partial or complete.

It consists in placing spherical bodies, like balls or shot, within a box or bearing that supports an axle or shaft of a diameter about or nearly equal to an annular space left between the axle or shaft and the box, so as to produce anti-friction surfaces on all sides of the axle or shaft. I have in this example illustrated my invention by showing it applied to the hub and axle of a wagon.

A designates an incomplete hub of a wagon, and B an axle. C is a shoulder on the axle which comes against the inside of the hub, and D the usual nut at the end of the axle. Within the axle I place or form a box, E, which may extend from one end to the other of the hub, as in this case. This box is a hollow cylinder whose inner circumference is concentric with the circumference of the axle and whose inside diameter is greater than the diameter of the axle, so as to leave an annular space between them throughout the whole length of the box. This annular space is of the same diameter in all parts of it. If the axle is made tapering, the box is made of the like taper.

A cap, F, whose center is perforated with a hole of the diameter of the axle, is secured to the inside of the hub over the box, so as to cover the annular space left between the box and the axle, and the axle is then put through the box. The outer end of the hub being now turned up, the said annular space is next filled with spherical bodies of metal, like shot or balls, whose diameter is such as to roll easily in such annular space, when another cap, F, is placed over the end of the axle and secured to the outer end of the hub, so as to cover the outer end of said annular space. The axle may then be secured to the hub by the nut G or other suitable device.

The same principle of construction can be applied to all bearings of cylindrical or conical bodies, whether vertical or horizontal or inclined, such as boxes for lines of shafting, bearings for spindles, and other mechanical contrivances.

It will be observed that my improvement is different from the ordinary anti-friction devices of parallel cylindrical rollers arranged around a shaft or axle and rotating on centers, and that the principle thereof is different. The spherical bodies which I interpose between the axle or shaft and the sides of its box are free to revolve in all directions, and present the smallest possible surface to the contact of the axle or shaft. They will not become jammed, as is the case with anti-friction rollers turning on fixed centers, and they will form a complete anti-friction bearing throughout the whole extent of the box, their points of contact with the axle or shaft being the smallest possible.

The caps F are here let into the ends of the hub, so as to be out of the way of the shoulder and nut of the axle.

When it is desired to remove the wheel from the axle the nut or other fastening device is first taken off and the false shaft H is screwed onto the end of the axle. This false shaft is of about the same diameter as the axle, so that it can enter the axle-box easily. When it is screwed onto the axle it forms a continuation thereof, and enables one to take off the wheel without allowing the balls to become displaced or to fall out of the box. As the wheel comes off the true axle the false axle takes its place, and they can then be unscrewed, when the false axle will be left in the box, keeping the balls in place while the wheel is disconnected. When the parts are to be again connected the false axle is again screwed onto the true one and the wheel shoved up to it place, as before.

I claim as new and desire to secure by Letters Patent—

1. Surrounding an axle or shaft having rotary motion with free spherical bodies inclosed within an annular space formed around the axle or shaft, so as to form the bearing of such axle or shaft, substantially as described.

2. The false axle H, combined with axle B, made and applied substantially as above set forth.

The above specification of my invention signed by me this 11th day of January, 1866.

O. H. P. ROBINSON.

Witnesses:
  M. M. LIVINGSTON,
  ALEX. F. ROBERTS.